United States Patent
You et al.

(10) Patent No.: US 8,401,040 B2
(45) Date of Patent: Mar. 19, 2013

(54) APPARATUS AND METHOD FOR TRANSFORMING CABLE CHANNEL

(75) Inventors: Woong-Shik You, Daejon (KR); Joon-Young Jung, Daelon (KR); Yong-Seong Cho, Jeonbuk (KR); Han-Seung Koo, Daejon (KR); O-Hyung Kwon, Daejon (KR); Soo-In Lee, Daejon (KR)

(73) Assignee: Electronics and Telecommunications Research Institute (KR)

( * ) Notice: Subject to any disclaimer, the term of this patent is extended or adjusted under 35 U.S.C. 154(b) by 1811 days.

(21) Appl. No.: 11/299,214

(22) Filed: Dec. 8, 2005

(65) Prior Publication Data

US 2006/0153224 A1 Jul. 13, 2006

(30) Foreign Application Priority Data

Dec. 9, 2004 (KR) .................. 10-2004-0103748
Jun. 13, 2005 (KR) .................. 10-2005-0050392

(51) Int. Cl.
*H04H 20/28* (2008.01)
(52) U.S. Cl. ............... 370/487; 725/74; 725/118
(58) Field of Classification Search ........... 370/464, 370/431, 442, 401; 725/114, 151, 129, 110, 725/111
See application file for complete search history.

(56) References Cited

U.S. PATENT DOCUMENTS

| 5,640,385 A * | 6/1997 | Long et al. ............... 370/335 |
| 6,763,025 B2 | 7/2004 | Leatherbury et al. |
| 7,007,296 B2 * | 2/2006 | Rakib .................. 725/111 |
| 7,139,545 B2 * | 11/2006 | Drentea ................ 455/314 |
| 7,366,203 B2 * | 4/2008 | Deas .................. 370/487 |
| 7,725,913 B1 * | 5/2010 | Stallworth ............. 725/118 |
| 2004/0034877 A1 * | 2/2004 | Nogues ................ 725/151 |
| 2007/0116097 A1 * | 5/2007 | Santhoff et al. ......... 375/130 |

FOREIGN PATENT DOCUMENTS

| KR | 100237708 | 10/1999 |
| KR | 10-0274761 | 9/2000 |
| KR | 2003-0074992 | 9/2003 |

* cited by examiner

*Primary Examiner* — Michael J Moore, Jr.
(74) *Attorney, Agent, or Firm* — Blakely, Sokoloff, Taylor & Zafman

(57) ABSTRACT

Provided is apparatus and method for transforming cable channel. The apparatus includes a data mixing unit for receiving and mixing a band data and a first broadband data, to thereby generate a second broadband data of a broadband cable channel, and a channel adapting unit for dividing a band data from the second broadband data received through the broadband cable channel, bypassing the second broadband data to a first subscriber apparatus and transmitting the band data to a second subscriber apparatus.

6 Claims, 3 Drawing Sheets

APPARATUS AND METHOD FOR TRANSFORMING CABLE CHANNEL

FIELD OF THE INVENTION

The present invention relates to an apparatus and method for transforming a cable channel; and, more particularly, to an apparatus and a method for transforming a cable channel in order to transceive a broadband cable data/control information (hereinafter, called as "broadband data") and data/control information having a certain bandwidth (hereinafter, called as "band data") through one channel by mixing and dividing the broadband data and the band data.

DESCRIPTION OF RELATED ART

In the present invention, channel transformation means transforming two different type of data having a different bandwidth from each other into a broadband data, which can be transmitted through one broadband channel, by mixing two data having a different bandwidth, bypassing the broadband data, which can be transmitted through one broadband channel, or dividing the broadband data into a plurality of data each having a different according to the data type.

Hybrid Fiber-Coax (HFC) network uses an optical fiber cable and a coaxial cable in the network for transmitting the broadband data contents e.g., video data, text data and audio data.

In general, a local cable TV company uses an optical fiber cable in a region to nodes, which is neighboring a user, e.g., a company or a home, and does a coaxial cable in a region from the nodes to the company or the home.

A merit of the HFC network supplies a user with characteristic of an optical cable without changing the coaxial cable already installed in the company or the home.

A cable TV company and a telephone company apply the HFC network to a communication network to be newly established to be upgraded and share a basic facility for transmitting video data and audio data in the same system.

Meanwhile, to receive a broadcasting service and a communication service through the HFC network, it needs a tuner tuning the 6 MHz frequency band. In order to provide the broadcasting service and the communication service in the 6 MHz frequency band, about 40 Mbps per a channel is necessary. However, the bandwidth of 40 Mbps per a channel is quite restricted for providing required service since high definition TV broadcasting and a user data are increased.

A broadband cable channel having a frequency bandwidth over 6 MHz is provided for increasing a bandwidth of data per a channel to solve the above problem. However, if a broadcasting service and a communication service are provided through a broadband cable channel, data bandwidth over hundreds Mbps per a channel can be used, but subscriber apparatus tuning a 6 MHz frequency band cannot receive the service and data provided through the broadband cable channel.

Accordingly, since broadcasting station should keep providing data of 6 MHz band to a subscriber apparatus, two kinds of channels are required to transmit the data of 6 MHz band and the broadband data for conventional subscribers or new subscribers. Namely, this method needs a cost installing additional channel for the broadband data in order to transmit the data of 6 MHz band and broadband data through two channels, and a cost for maintaining two channels.

Accordingly, a method for transmitting the broadband data and the data of 6 MHz band together through one channel without a further installing cost is required.

SUMMARY OF THE INVENTION

It is, therefore, an object of the present invention to provide an apparatus and a method for transforming a broadband cable channel to transceive a broadband data and a band data through one channel by mixing and dividing the broadband data and the band data.

In accordance with an aspect of the present invention, there is provided an apparatus for transforming a broadband cable channel, including a data mixing unit for receiving and mixing a band data and a first broadband data, to thereby generate a second broadband data of a broadband cable channel, and a channel adapting unit for dividing a band data from the second broadband data received through the broadband cable channel, bypassing the second broadband data to a first subscriber apparatus and transmitting the band data to a second subscriber apparatus.

In accordance with an aspect of the present invention, there is provided a method for transforming a broadband cable channel, the method includes the steps of a) receiving and mixing a band data and a first broadband data, to thereby generate a second broadband data to be adapted in a broadband cable channel, and b) receiving the second broadband data through the broadband cable channel, dividing the band data from the second broadband data and bypassing the second broadband data.

Other objects and advantages of the invention will be understood by the following description and become more apparent from the embodiments in accordance with the present invention, which is set forth hereinafter. It will be also apparent that objects and aspects of the invention can be embodied easily by the means defined in the claims and combinations thereof.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
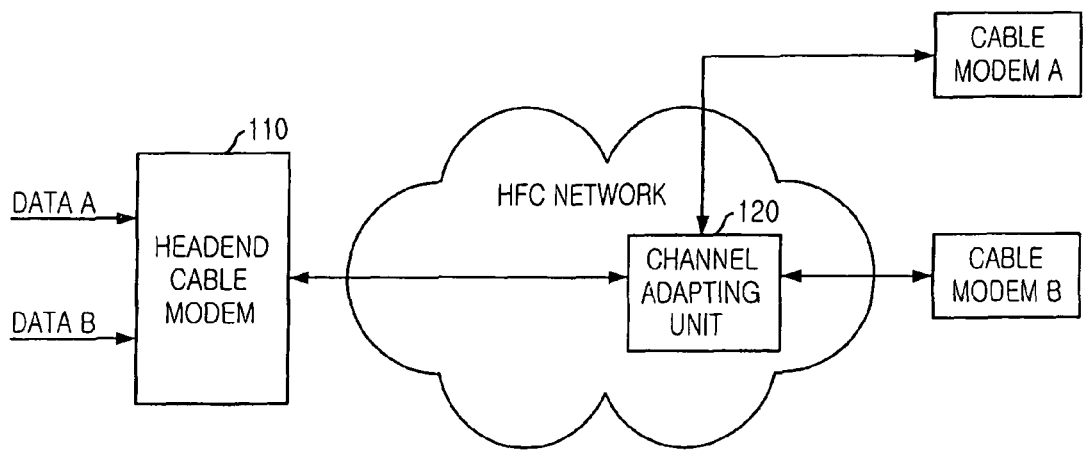
FIG. 1 is a block diagram showing a broadband cable channel transformation apparatus in accordance with an embodiment of the present invention.

FIG. 1 is a block diagram showing a broadband cable channel transformation apparatus in accordance with an embodiment of the present invention.

As shown in FIG. 1, an apparatus for transforming broadband cable channel according to an embodiment of the present invention includes a data mixing unit 110 and a channel adapting unit 120.

In this embodiment, a head-end cable modem is described as a data mixing unit, however, it is well known to ordinary one skilled in the art that the present invention is not limited to the fact.

The data mixing unit 110 is located in a cable broadcasting station or a repeater, and receives data from a back-bone network or other apparatus, and transmits the received data through a HFC network.

The data mixing unit 110 receives the band data, having a 6 MHz frequency band, and broadband data having a higher frequency than 6 MHz an apparatus located in a back-bone network or a cable broadcasting station, e.g., an audio/video (A/V) encoder and a server.

Moreover, the data mixing unit 110 restructures the received data and control information into data and control information appropriate to the broadband cable frequency channel of a HFC network.

For example, if data and control information of 6 MHz frequency band, and data and control information of 54 MHz band are received, the received data and control information of 6 MHz and 54 MHz are mixed to data and control information based on 60 MHz broadband cable frequency channel, and then the mixed data and control information is transmitted to the HFC network.

Hereinafter, 6 MHz frequency band is called as frequency band and 54 MHz frequency band is called as a first broadband cable frequency channel, and 60 MHz frequency band (HFC network) is called as a second broadband cable frequency channel.

Meanwhile, the channel adapting unit 120, which receives a mixed signal transmitted through the HFC network, bypasses a second broadband data and control information for a subscriber apparatus (modem A) tuning a second broadband cable frequency channel, and extracts and restructures the band data and control information for a subscriber apparatus (modem B) from the second broadband data.

Accordingly, a subscriber apparatus (modem A) tuning the second broadband cable frequency channel receives a broadband cable broadcasting service and a communication service, and a subscriber apparatus (modem B) tuning a frequency band receives a cable broadcasting service and a communication service without additional apparatus.

Figure 2:
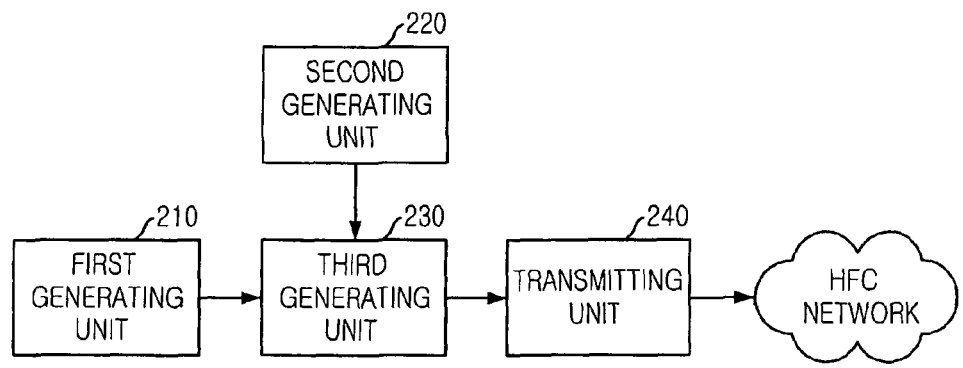
FIG. 2 is a detailed block diagram showing a head-end cable modem of a broadband cable channel transformation apparatus in accordance with an embodiment of the present invention.

FIG. 2 is a detailed block diagram showing a head-end cable modem of a broadband cable channel transformation apparatus in accordance with an embodiment of the present invention.

A channel from the HFC network and the channel adapting unit 120 to respective subscriber apparatus is a cable network in an embodiment of the present invention.

Accordingly, the data and control information is changed into a cable signal based on band by bypassing broadband data or dividing band data to transmit data and control information from the HFC network and the channel adapting unit 120 to respective subscriber apparatus.

As shown in FIG. 2, the data mixing unit 110 includes a first generating unit 210, a second generating unit 220, a third generating unit 230 and a transmitting unit 240.

The first generating unit 210 receives and capsulizes a broadband data to be transmitted through a first broadband channel.

The second generating unit 220 receives and capsulizes a band data to be transmitted through a band channel.

The third generating unit 230 regenerates a mixed signal to be transmitted through a second broadband cable channel by mixing the broadband data capsulized in the first generating unit and the band data capsulized in the second generating unit into a second broadband cable signal.

The transmitting unit 240 transmits the second broadband cable signal regenerated in the third generating unit 230.

Data and control information having a different band can be transmitted through not two channels but one channel by mixing a band data and a first broadband data.

Accordingly, a cost for maintaining and installing two channels can be reduced.

Figure 3:
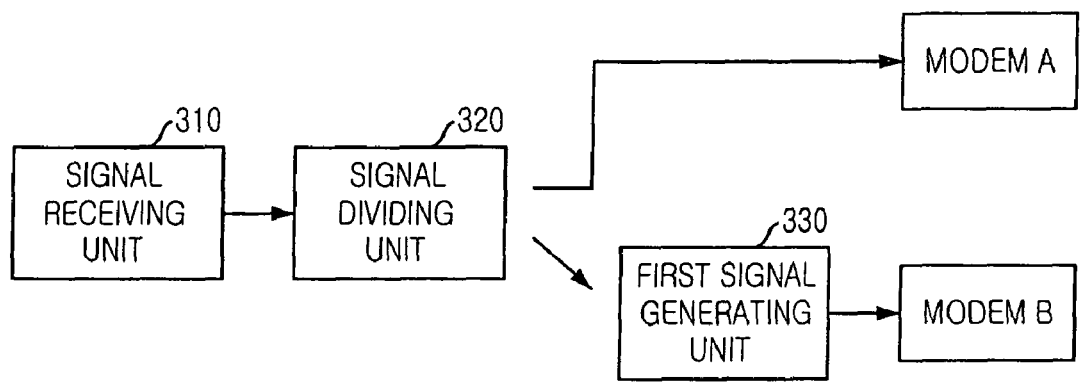
FIG. 3 is a detailed block diagram showing a channel adapting unit of an apparatus for transforming broadband cable channel in accordance with an embodiment of the present invention.

FIG. 3 is a detailed block diagram showing a channel adapting unit in accordance with an embodiment of the present invention.

As shown in FIG. 3, a channel adapting unit 120 includes a signal receiving unit 310, a signal dividing unit 320 and a first generating unit 330.

The signal receiving unit 310 receives the mixed signal transmitted through the second broadband cable channel.

The signal dividing unit 320 divides the mixed signal received in the signal receiving unit 310 into a band data and the broadband data.

The first generating unit 330 restructures the band data into a cable signal appropriate for the band channel, and transmits the restructured data to a subscriber terminal capable of receiving the band data.

Meanwhile, the signal dividing unit 320 bypasses the second broadband cable signal received through the signal receiving unit 310 to a subscriber terminal.

The subscriber terminal (modem A) receiving the second broadband data and a subscriber terminal (modem B) receiving the band data receive a cable broadcasting service and a communication service through one channel by receiving and dividing the second broadband data signal including band data into a signal of a certain frequency band that a subscriber terminal can receive.

Accordingly, a conventional subscriber is provided with a cable broadcasting service and a communication service can be provided to the subscriber without an additional apparatus.

Figure 4:
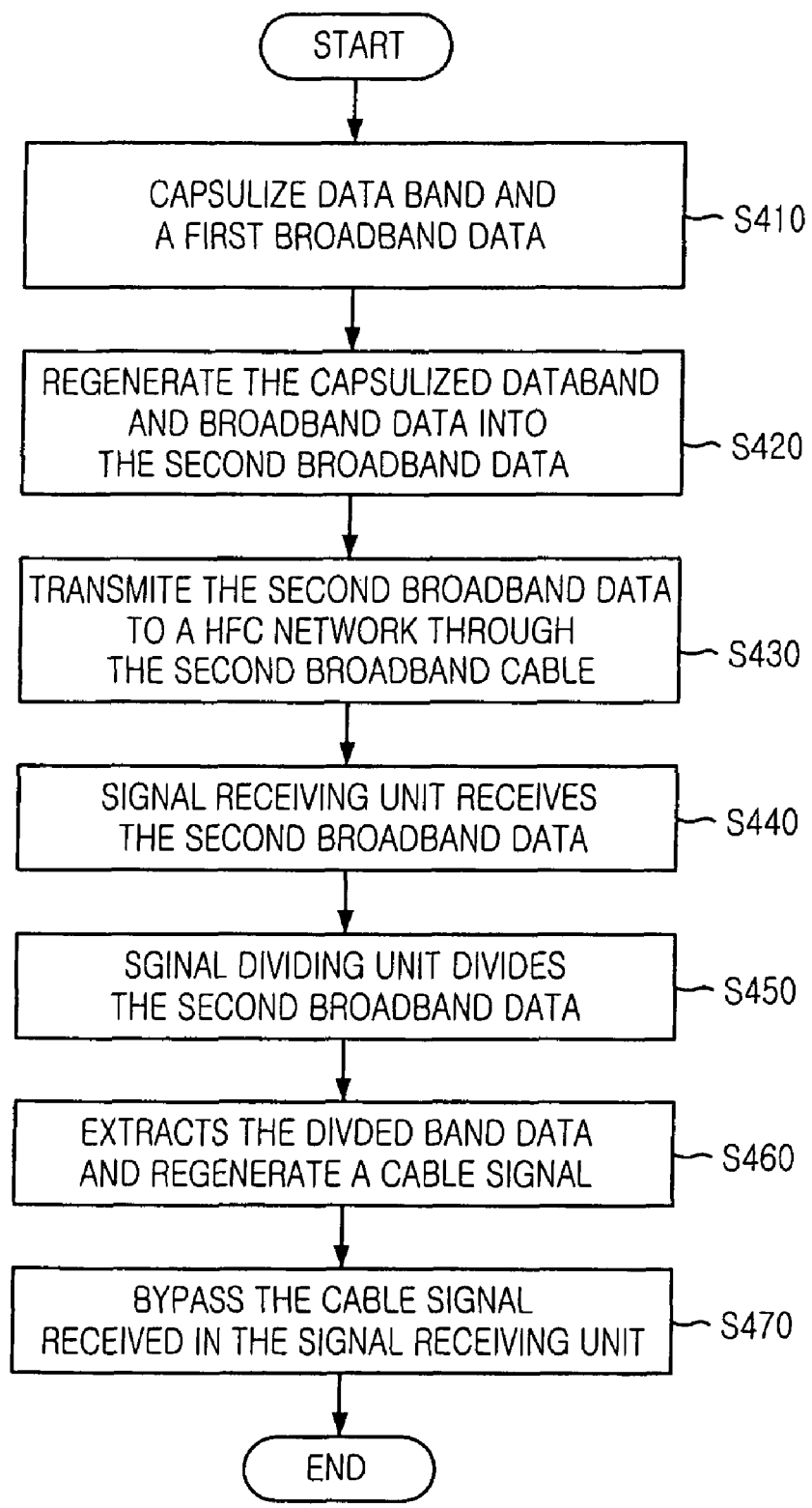
FIG. 4 shows a flow chart illustrating a broadband cable channel transformation method in accordance with an embodiment of the present invention.

FIG. 4 shows a flow chart according to an embodiment of the present invention.

In first, the first generating unit 210 and the second generating unit 220 of the data mixing unit 110 capsulize the band data and broadband data at step S410.

The third generating unit 230 regenerates the capsulized band data and broadband data in the first generating unit 210 and the second generating unit 220 into the second broadband data based on transmission protocol of the second broadband cable channel, and the second broadband data is a kind of a cable signal data to be transmitted through the second broadband cable channel at step S420.

Namely, a second broadband data of 60 MHz is regenerated based on the first broadband data of 54 MHz band, and the band data of 6 MHz band.

Subsequently, the signal transmitting unit 240 transmits a cable signal regenerated in the third generating unit 230 to a HFC network through the second broadband cable channel at step S430.

Next, the signal receiving unit 310 of the channel adapting unit 120 receives the cable signal at step S440.

Subsequently, the channel adapting unit 320 divides the cable signal received in the signal receiving unit 310 to thereby generate divided signal.

Next, the first generating unit 330 extracts the band data divided in the signal dividing unit 320, and regenerates a cable signal in band channel at step S460, and transmits the cable signal to a subscriber terminal capable of receiving the band data.

Moreover, the channel adapting unit 320 bypasses the cable signal received in the signal receiving unit 310 into the subscriber terminal capable of receiving the second broadband data.

As above-mentioned, the method of the present invention can be embodied as a program and stored in recording media readable by a computer, e.g., CD-ROM, RAM, floppy disk, hard disk, magneto-optical disk, etc.

The present application contains subject matter related to Korean Patent Application No. 2004-0103748, filed in the Korean Patent Office on Dec. 9, 2004, and Korean Patent Application No. 2005-0050392, filed in the Korean Patent Office on Jun. 13, 2005, the entire contents of which being incorporated herein by reference.

While the present invention has been described with respect to certain preferred embodiments, it will be apparent to those skilled in the art that various changes and modifications may be made without departing from the scope of the invention as defined in the following claims.

What is claimed is:

1. An apparatus for transforming a broadband cable channel, comprising:
    a data mixing unit for receiving a band data having a first frequency band and a first broadband data having a second frequency band, and generating a second broadband data having a third frequency band, which is corresponded to a broadband cable channel, by mixing the band data and the first broadband data; and
    a channel adapting unit for receiving the second broadband data through the broadband cable channel, dividing the band data from the received second broadband data, bypassing the received second broadband data to a first subscriber apparatus, and transmitting the divided band data to a second subscriber apparatus;
    wherein the third frequency band is greater band than the second frequency band, and the first frequency band is less band than the second frequency band.

2. The apparatus as recited in claim 1, wherein the data mixing unit includes:
    a first generating unit for receiving the first broadband data, and capsulizing the received first broadband data;
    a second generating unit for receiving the band data, and capsulizing the received band data;
    a third generating unit for generating the second broadband data, so that the second broadband data is transmitted through the broadband cable channel, by mixing the capsulized first broadband data and the capsulized band data; and
    a transmitting unit for transmitting the generated second broadband data through the broadband cable channel.

3. The apparatus as recited in claim wherein the channel adapting unit includes:
    a signal receiving unit for receiving the second broadband data transmitted through the broadband cable channel;
    a signal dividing unit for dividing the band data from the received second broadband data, and for bypassing the received second broadband data; and
    a first generating unit for extracting the band data corresponding to the first frequency band from the divided band data, and transmitting the extracted band data to the second subscriber apparatus.

4. A method for transforming a broadband cable channel, the method comprising the steps of:
    a) receiving a hand data having a first frequency band and a first broadband data having a second frequency band, and generating a second broadband data having a third frequency band corresponding to a broadband cable channel by mixing the band data and the first broadband data; and
    b) receiving the second broadband data through the broadband cable channel, dividing the band data from the received second broadband data, and bypassing the received second broadband data to a first subscriber apparatus, and transmitting the divided band data to a second subscriber apparatus;
    wherein the third frequency band is greater band than the second frequency band, and the first frequency band is less band than the second frequency band.

5. The method as recited in claim 4, wherein the step a) includes the steps of:
    receiving the band data, and capsulizing the received band data;
    receiving the first broadband data, and capsulizing the received first broadband data;
    generating the second broadband data, so that the second broadband data is transmitted through the broadband cable channel, by mixing the capsulized band data and the capsulized first broadband data; and
    transmitting the generated second broadband data through the broadband cable channel.

6. The method as recited in claim 4, wherein the step b) includes the steps of:
    receiving the second broadband data transmitted through the broadband cable channel;
    dividing the band data from the received second broadband data:
    passing the received second broadband data to the first subscriber apparatus; and
    extracting the band data corresponding to the first frequency band from the divided band data, and transmitting the extracted hand data to the second subscriber apparatus.

\* \* \* \* \*